(No Model.)

T. A. SHINN.
CARVING FORK.

No. 253,634. Patented Feb. 14, 1882.

WITNESSES:

INVENTOR

ATTORNEY

UNITED STATES PATENT OFFICE.

THORNTON A. SHINN, OF PHILADELPHIA, PENNSYLVANIA.

CARVING-FORK.

SPECIFICATION forming part of Letters Patent No. 253,634, dated February 14, 1882.

Application filed October 22, 1881. (No model.)

*To all whom it may concern:*

Be it known that I, THORNTON A. SHINN, a citizen of the United States, residing in Philadelphia, county of Philadelphia, State of Pennsylvania, have invented new and useful combinations in connection with Carving-Forks, of which the following is a specification.

My invention relates to the attachment to a carving-fork of, first, a guard of steel having cut thereon file-teeth to be used for sharpening knives, and a change in the form of the shank to any desired shape to serve as a steel for smoothing and polishing the edge of the knife; second, a device attached to the fork, which, in conjunction with one of the tines, forms an appliance for drawing skewers; third, the attachment of a corkscrew to increase the utility of the article, but having no relation to the guard.

The object of my improvement is to provide a convenient and cheap combination of household articles in one; and I attain this object by the various attachments illustrated in the accompanying drawings, in which similar letters refer to similar parts throughout the several views.

Figure 1:
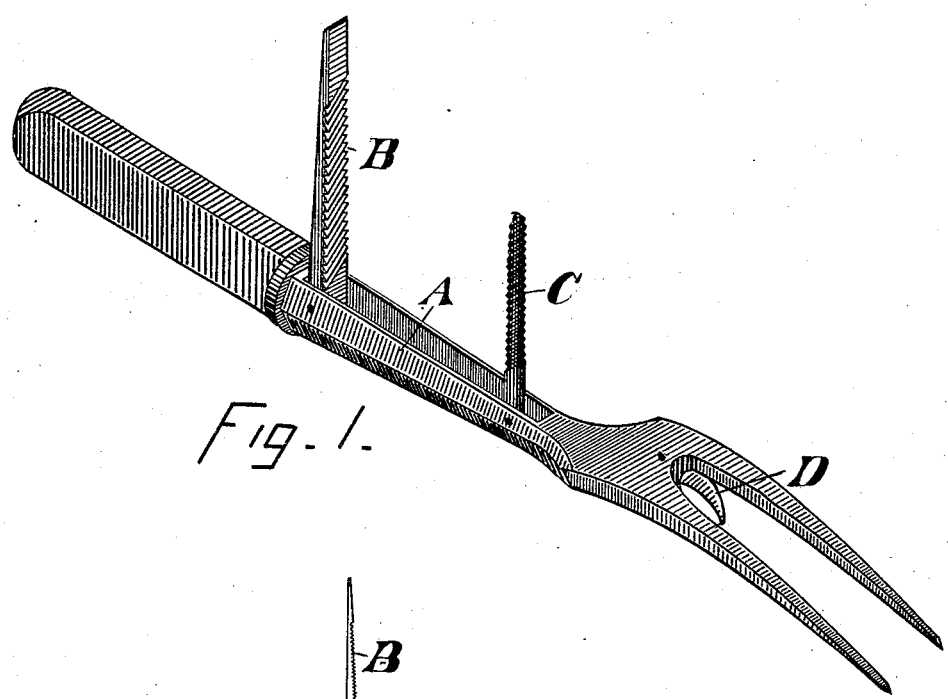
Figure 2:
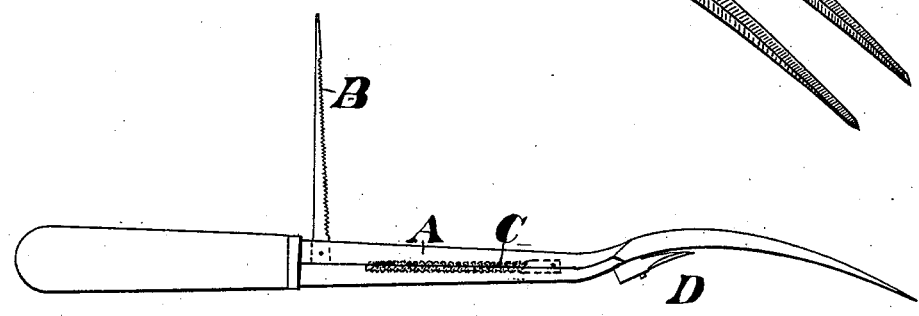
Figure 3:
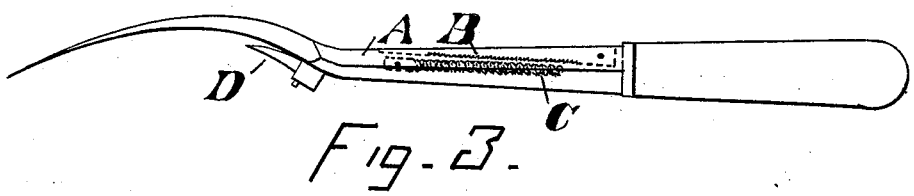

Figure 1 is a perspective view, exhibiting the fork with its several attachments in combination, wherein A represents the shank; B, the guard with file-teeth cut thereon; C, a corkscrew, and D the skewer-drawer. Fig. 2 is a side view, representing the guard B in position and the corkscrew C, by the dotted lines, in the groove of the shank; Fig. 3, also a side view, showing the skewer-drawer D and the shank A when used as a steel.

The manner of constructing the fork is the same as ordinarily employed, and the mode of attaching the several improvements will be manifest to any mechanician. I use the ordinary guard, which is common and well known, with improvement thereon of a series of file-teeth, which, in conjunction with the shank of the fork, formed to serve as a steel, provides a complete appliance for sharpening knives. The attachment of the movable device D, or its equivalent, in connection with one of the tines, forms a skewer-drawer, which is operated by pressing the thumb on the reverse end of the jaw grasping the skewer between the jaw and the tine.

The attachment of the corkscrew C is intended to be used as a corkscrew only, and for no other purpose, and when not in use remains in the slot in the shank of the fork under the guard.

I am aware that the idea of combining a fork and a corkscrew which acts as a guard in one device is not broadly new. I therefore do not claim such a combination, broadly; but What I do claim as my invention, and desire to secure by Letters Patent, is—

The combination, in a carving-fork, of the guard B, with file-teeth cut thereon, and the shank A, formed to operate as a steel, both substantially as set forth.

THORNTON A. SHINN.

Witnesses:
THOS. RANDALL,
A. T. SHINN.